United States Patent
Li

(10) Patent No.: US 11,251,961 B2
(45) Date of Patent: Feb. 15, 2022

(54) METHODS AND APPARATUSES FOR STORING OR INVOKING BLOCKCHAIN ACCOUNT PRIVATE KEYS

(71) Applicant: Advanced New Technologies Co., Ltd., Grand Cayman (KY)

(72) Inventor: Yanpeng Li, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/244,801

(22) Filed: Apr. 29, 2021

(65) Prior Publication Data
US 2021/0250175 A1    Aug. 12, 2021

Related U.S. Application Data

(63) Continuation of application No. PCT/CN2020/073740, filed on Jan. 22, 2020.

(30) Foreign Application Priority Data

Feb. 27, 2019    (CN) .......................... 201910144356.5

(51) Int. Cl.
*H04L 9/32*    (2006.01)
*H04L 9/08*    (2006.01)

(52) U.S. Cl.
CPC .......... *H04L 9/3231* (2013.01); *H04L 9/0894* (2013.01); *H04L 9/3263* (2013.01)

(58) Field of Classification Search
None
See application file for complete search history.

(56) References Cited

U.S. PATENT DOCUMENTS

2001/0034834 A1    10/2001    Matsuyama et al.
2017/0339164 A1*   11/2017    Oberheide .......... H04L 63/0823
(Continued)

FOREIGN PATENT DOCUMENTS

CN    109150535    1/2019
CN    109361663    2/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Brandon S Hoffman
(74) *Attorney, Agent, or Firm* — Fish & Richardson P.C.

(57) ABSTRACT

Methods, systems and apparatus, including computer programs encoded on computer storage media, for managing account private keys of a blockchain account registered by a user. In one example, the method includes obtaining identification information provided by the user; obtaining a private key set provided by the user, wherein the private key set comprises at least one account private key of a blockchain account registered by the user; establishing and storing an association relationship between the identification information and the private key set; obtaining an encryption key provided by the user; encrypting the private key set by using the encryption key to obtain an encrypted private key set; and storing the encrypted private key set on the user device.

21 Claims, 2 Drawing Sheets

(56) References Cited

U.S. PATENT DOCUMENTS

2018/0144341 A1    5/2018  Kärkkäinen et al.
2018/0227293 A1*   8/2018  Uhr .................... G06Q 20/3821

FOREIGN PATENT DOCUMENTS

| CN | 109379189 | 2/2019 |
| CN | 110020857 | 7/2019 |
| GN | 106548345 | 3/2017 |
| GN | 107528688 | 12/2017 |
| GN | 108259169 | 7/2018 |
| TW | I644556 | 12/2018 |
| TW | 201902179 | 1/2019 |
| TW | 201926111 | 7/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion In International Application No. PCT/CN2020/073740, dated Apr. 22, 2020, 10 pages (with partial English translation).

PCT Preliminary Report on Patentability In International Application No. PCT/CN2020/073740, dated Aug. 25, 2021, 11 pages (with English translation).

Extended European Search Report in European Application No. 20763626.7, dated Dec. 6, 2021, 8 pages.

* cited by examiner

METHODS AND APPARATUSES FOR STORING OR INVOKING BLOCKCHAIN ACCOUNT PRIVATE KEYS

CROSS-REFERENCE TO RELATED APPLICATIONS

This application is a continuation of PCT Application No. PCT/2020/073740, filed on Jan. 22, 2020, which claims priority to Chinese Patent Application No. 201910144356.5, filed on Feb. 27, 2019, and each application is hereby incorporated by reference in its entirety.

TECHNICAL FIELD

Embodiments of the present specification relate to the field of information technologies, and in particular, to methods and apparatuses for storing blockchain account private keys.

BACKGROUND

In a blockchain network-based service mode, users usually need to register blockchain accounts (or referred to as user accounts) in a blockchain network, and need to keep account private keys of the blockchain accounts registered by the users. The account private keys of the blockchain accounts are mainly used to sign transactions initiated by the blockchain accounts.

In practice, the users usually store the account private keys in the users' local disks, and obtain the account private keys from the local disks when in need. However, such a method for storing account private keys is less reliable.

SUMMARY

To resolve a problem of relatively low reliability occurring when users keep blockchain account private keys by themselves, embodiments of the present specification provide methods and apparatuses for storing or invoking blockchain account private keys. Technical solutions are as follows:

According to a first aspect of the embodiments of the present specification, a method for storing blockchain account private keys is provided, including: a private key management program installed on a user device of a user obtains a private key set; where the private key set includes at least one account private key of a blockchain account registered by the user; an encryption key provided by the user is obtained; and the private key set is encrypted by using the encryption key, and the encrypted private key set is stored.

According to a second aspect of the embodiments of the present specification, a method for invoking account private keys stored based on the method in the first aspect is provided, including: a private key management program obtains a decryption key provided by the user; the encrypted private key set is decrypted by using the decryption key; and the decrypted private key set is returned to the user.

According to the technical solutions provided in the embodiments of the present specification, a private key management program is installed on a user device of a user. The private key management program is responsible for encrypting and storing a blockchain account private key of the user. An encryption key used to encrypt the blockchain account private key of the user is specified by the user. When the user wants to use the blockchain account private key of the user, the user needs to provide a decryption key corresponding to the encryption key to the private key management program, so that the private key management program can provide a decrypted account private key to the user for use.

The embodiments of the present specification can implement the following technical effects:

1. Users do not need to memorize a storage location of their own account private key in a disk, and will not encounter a situation that the users fail to find their own account private key. As the private key management program is responsible for storing the account private key, users directly request the account private key from the private key management program when in need.

2. The private key management program encrypts the account private key by using the encryption key specified by the user. A person other than the user cannot invoke the account private key of the user if the person cannot provide the decryption key corresponding to the encryption key to the private key management program.

It should be understood that the previous general description and the following detailed description are merely examples and illustrative, and cannot limit the embodiments of the present specification.

In addition, there is no need for any embodiment of the present specification to achieve all effects described above.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description merely show some embodiments of the present specification, and a person of ordinary skill in the art can still derive other drawings from these accompanying drawings.

DESCRIPTION OF EMBODIMENTS

In the existing technologies, users usually keep their own blockchain account key. Such a storage mode imposes a high requirement on the users and the users need to memorize a storage location of their own account key in a local disk. In addition, if a person other than the user have access to information about the storage location of the user's account key in the disk, the person may use the user's account key without authorization or permission.

Therefore, in the embodiments of the present specification, a private key management program is introduced and is installed on a user device of a user. The user provides an account private key that needs to be stored to the private key manager for storage, and designates an encryption key to the private key manager. The private key manager stores the account private key in a disk of the user device after encrypting the account private key by using the encryption key. In one aspect, the stored encrypted account private key can be used only after being decrypted by using a decryption key which is generally known only to the user. In another aspect, the private key manager can retrieve the account private key from a storage location of the account private key at any time as requested by the user, and a situation that the user fails to find the account private key will not occur.

To make a person skilled in the art better understand the technical solutions in the embodiments of the present specification, the following describes in detail the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification shall fall within the protection scope of the present specification.

The technical solutions provided in the embodiments of the present specification are described in detail below with reference to the accompanying drawings.

Figure 1:
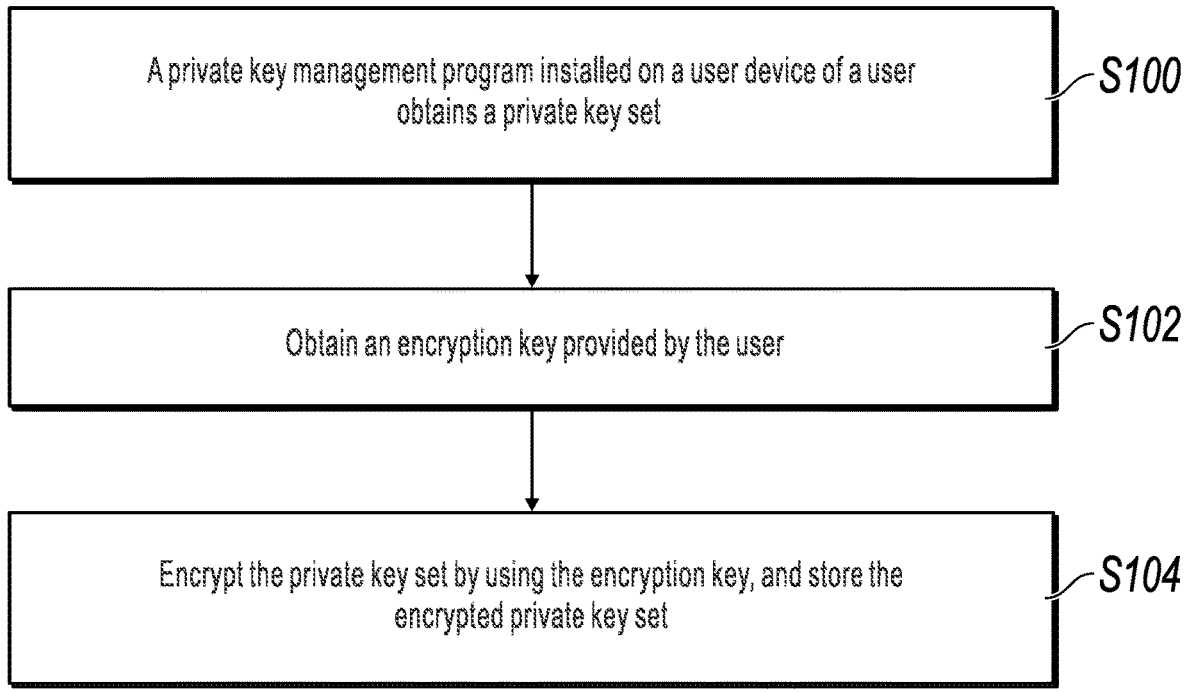
FIG. 1 is a schematic flowchart illustrating a method for storing blockchain account private keys, according to some embodiments of the present specification.

FIG. 1 is a schematic flowchart illustrating a method for storing blockchain account private keys, according to some embodiments of the present specification. The method includes the following steps:

S100: A private key management program installed on a user device of a user obtains a private key set.

In the embodiments of the present specification, the private key management program is a program that is responsible for storing a private key (referred to as an account private key below) of a blockchain account registered by a user.

When the user wants to store the user's account private key, the user can start the private key management program, and input the user's account private key into the private key management program.

It should be understood that, the user can have more than one account private key. That is, the private key management program needs to store a private key set that includes at least one account private key input by the user.

Further, the private key set further includes an account private key provided by at least one other user to the user; and for each other user, the account private key provided by the other user to the user is an account private key of a blockchain account registered by the other user.

S102: Obtain an encryption key provided by the user.

In the embodiments of the present specification, the user further needs to input an encryption key into the private key management program, so as to encrypt the user's account private key. The encryption key is generally a symmetric encryption key, and can alternatively be an asymmetric encryption key.

S104: Encrypt the private key set by using the encryption key, and store the encrypted private key set.

Because the private key set is stored in the user device in an encrypted form, plaintext of the private key set can hardly be compromised even if the user device is in possession by a person other than the user.

Figure 2:
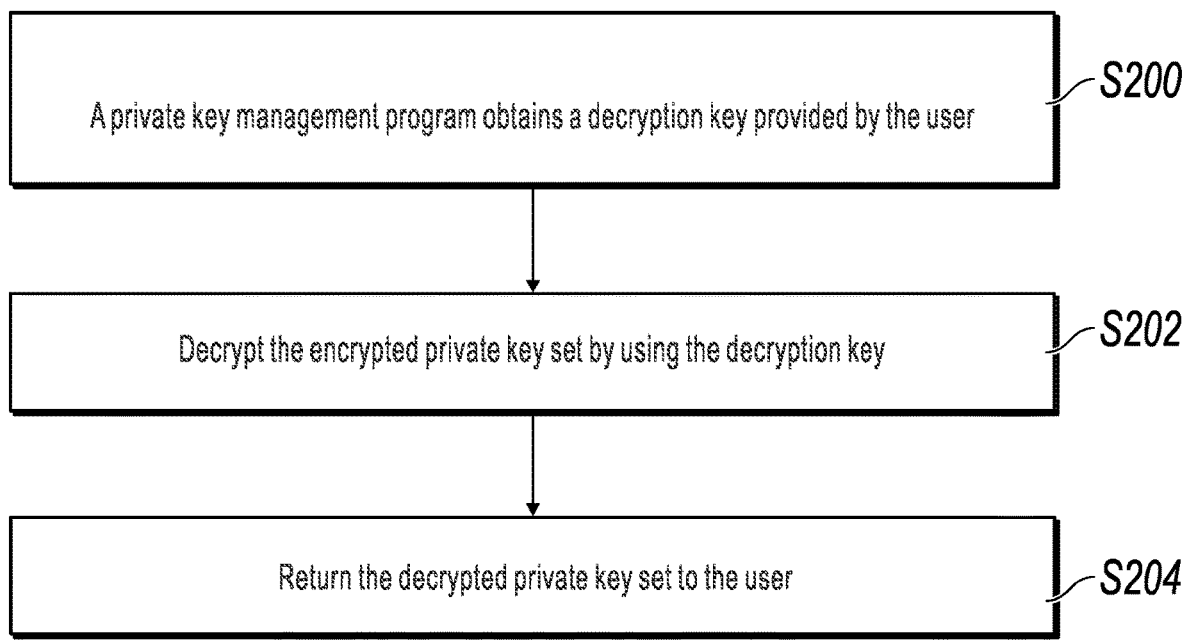
FIG. 2 is a schematic flowchart illustrating a method for invoking blockchain account private keys, according to some embodiments of the present specification.

FIG. 2 is a schematic flowchart illustrating a method for invoking blockchain account private keys, according to some embodiments of the present specification. The method includes the following steps:

S200: A private key management program obtains a decryption key provided by the user.

S202: Decrypt the encrypted private key set by using the decryption key.

S204: Return the decrypted private key set to the user.

It should be understood that, the decryption key is in a mapping relationship with the previously described encryption key. That is, the decryption key is used to decrypt data encrypted by using the encryption key.

In addition, in the method shown in FIG. 1, the private key management program can further obtain identification information provided by the user, and then establish and store an association relationship between the identification information and the private key set. The identification information is information used to identify an identity of the user, such as a mobile number or an identity card number of the user. Further, the identification information can be specifically biometric identification information of the user, such as fingerprint information or face information.

Specifically, in the method shown in FIG. 1, the key management program can store the encrypted private key set after obtaining the identification information provided by the user. That is, if the user refuses to provide the key management program with the user's identification information (i.e., refuses to perform real-name authentication), the key management program refuses to store the private key set provided by the user.

Correspondingly, in the method shown in FIG. 2, before decrypting the encrypted private key set by using the decryption key, the key management program can obtain identification information provided by the user; and determine whether the identification information provided by the user matches the identification information associated with the private key set. That is, before decrypting the stored private key set, the key management program needs to first determine that a user that currently requests to obtain the private key set is an owner of the private key set.

If the identification information provided by the user matches the identification information associated with the private key set, the key management program decrypts the encrypted private key set by using the decryption key; or if the identification information provided by the user does not match the identification information associated with the private key set, the key management program refuses to decrypt the encrypted private key set by using the decryption key.

As only the user can invoke the account private key stored by the key management program, security of the user's account key is not jeopardized even if the previous encryption key is cracked by another user or the decryption key corresponding to the previous encryption key is obtained by another user.

Figure 3:
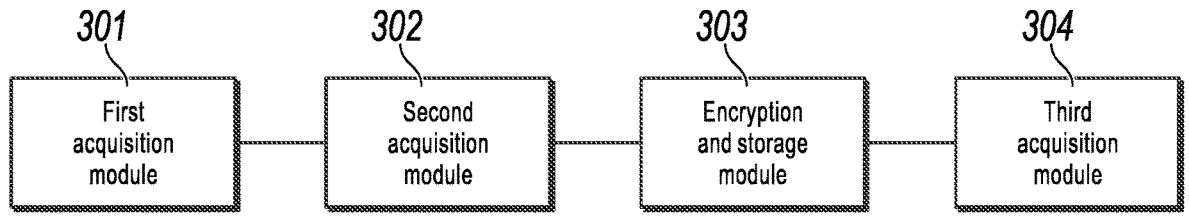
FIG. 3 is a schematic structural diagram illustrating an apparatus for storing blockchain account private keys, according to some embodiments of the present specification.

FIG. 3 is a schematic structural diagram illustrating an apparatus for storing blockchain account private keys, according to some embodiments of the present specification. The apparatus is installed on a user device of a user, and the apparatus includes the following:

a first acquisition module 301, configured to obtain a private key set; where the private key set includes at least one account private key of a blockchain account registered by the user;

a second acquisition module 302, configured to obtain an encryption key provided by the user; and an encryption and storage module 303, configured to encrypt the private key set by using the encryption key, and store the encrypted private key set.

The private key set further includes an account private key provided by at least one other user to the user; and for each other user, the account private key provided by the other user to the user is an account private key of a blockchain account registered by the other user.

The method further includes the following:

a third acquisition module 304, configured to obtain identification information provided by the user; and establish and store an association relationship between the identification information and the private key set.

After the identification information provided by the user is obtained, the encryption and storage module 303 stores the encrypted private key set.

Figure 4:
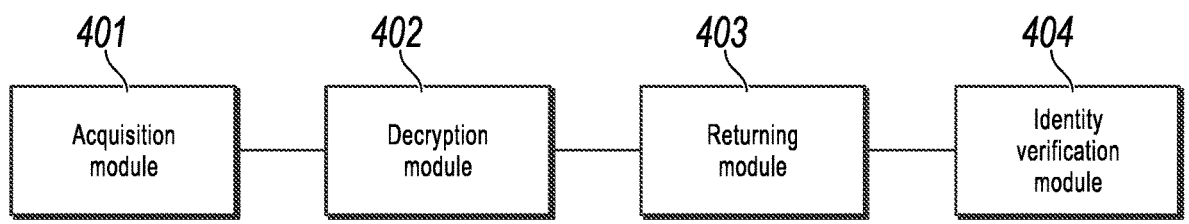
FIG. 4 is a schematic structural diagram illustrating an apparatus for invoking blockchain account private keys, according to some embodiments of the present specification.

FIG. 4 is a schematic structural diagram illustrating an apparatus for invoking blockchain account private keys, according to some embodiments of the present specification. The apparatus is installed on the user device of the user, and the apparatus includes the following:

an acquisition module 401, configured to obtain a decryption key provided by the user;

a decryption module 402, configured to decrypt the encrypted private key set by using the decryption key; and a returning module 403, configured to return the decrypted private key set to the user.

The apparatus further includes: an identity verification module 404, configured to, before the encrypted private key set is decrypted by using the decryption key, obtain identification information provided by the user; and determine whether the identification information provided by the user matches the identification information associated with the private key set; and the decryption module 402 is configured to, if the identity verification module 404 determines that the identification information provided by the user matches the identification information associated with the private key set, decrypt the encrypted private key set by using the decryption key; or if the identity verification module 404 determines that the identification information provided by the user does not match the identification information associated with the private key set, refuse to decrypt the encrypted private key set by using the decryption key.

Some embodiments of the present specification further provide a computer device. The computer device includes at least a memory, a processor, and a computer program that is stored in the memory and that can run on the processor. When executing the program, the processor implements functions of the method shown in FIG. 1 or FIG. 2.

Figure 5:
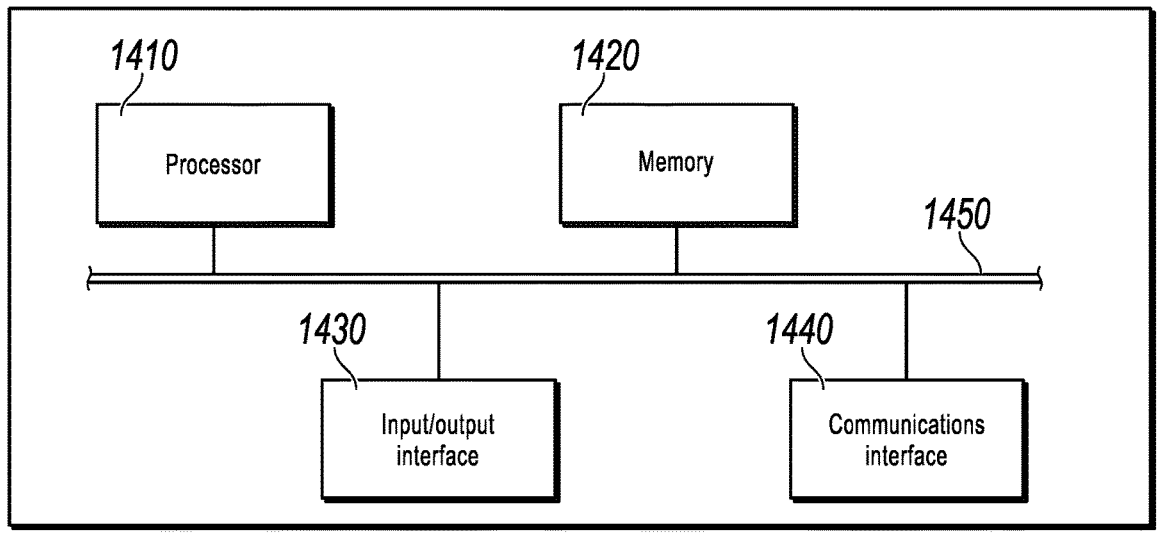
FIG. 5 is a schematic structural diagram illustrating a computer device used for configuring an apparatus in some embodiments of the present specification.

FIG. 5 is a more detailed schematic diagram illustrating a hardware structure of a computing device, according to some embodiments of the present application. The device can include a processor 1410, a memory 1420, an input/output interface 1430, a communications interface 1440, and a bus 1450. The processor 1410, the memory 1420, the input/output interface 1430, and the communications interface 1440 are communicatively connected to each other inside the device by using the bus 1450.

The processor 1410 can be implemented by using a general central processing unit (CPU), a microprocessor, an application-specific integrated circuit (ASIC), one or more integrated circuits, etc., and is configured to execute a related program, so as to implement the technical solutions provided in the embodiments of the present application.

The memory 1420 can be implemented by using a read-only memory (ROM), a random access memory (RAM), a static storage device, a dynamic storage device, etc. The memory 1420 can store an operating system and another application program. When the technical solutions provided in the embodiments of the present specification are implemented by using software or firmware, related program code is stored in the memory 1420, and is invoked and executed by the processor 1410.

The input/output interface 1430 is configured to be connected to an input/output module, to input or output information. The input/output module (not shown in the figure) can be used as a component and configured in the device, or can be externally connected to the device, to provide a corresponding function. The input device can include a keyboard, a mouse, a touchscreen, a microphone, various sensors, etc. The output device can include a display, a speaker, a vibrator, an indicator, etc.

The communications interface 1440 is configured to be connected to a communications module (not shown in the figure), to implement communication interaction between the device and another device. The communications module can implement communication in a wired method (for example, USB or a network cable), or can implement communication in a wireless method (for example, a mobile network, Wi-Fi, or Bluetooth).

The bus 1450 includes a channel, used to transmit information between components (for example, the processor 1410, the memory 1420, the input/output interface 1430, and the communications interface 1440) of the device.

It should be noted that although only the processor 1410, the memory 1420, the input/output interface 1430, the communications interface 1440, and the bus 1450 of the device are shown, during specific implementation, the device can further include other components necessary for implementing normal running. In addition, a person skilled in the art can understand that the device can include only components necessary for implementing the solutions in the embodiments of the present specification, but does not necessarily include all components shown in the figure.

Some embodiments of the present specification further provide a computer readable storage medium. The computer readable storage medium stores a computer program, and when executed by a processor, the program can implement functions of the method shown in FIG. 1 or FIG. 2.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It can be seen from the previous descriptions of the implementations that, a person skilled in the art can clearly understand that the embodiments of the present specification can be implemented by using software and a necessary general hardware platform. Based on such an understanding, the technical solutions in the embodiments of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the embodiments of the present specification or in some parts of the embodiments of the present specification.

The system, method, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The embodiments in the present specification are described in a progressive way. For same or similar parts of the embodiments, references can be made to the embodiments mutually. Each embodiment focuses on a difference from other embodiments. Particularly, method and device embodiments are similar to a method embodiment, and therefore are described briefly. For a related part, references can be made to some descriptions in the method embodiment. The previously described method embodiments are merely examples. The modules described as separate parts can be or do not have to be physically separate. During implementation of the solutions in the embodiments of the present application, functions of the modules can be implemented in one or more pieces of software and/or hardware. Some or all of the modules can be selected based on an actual need to implement the solutions of the embodiments. A person of ordinary skill in the art can understand and implement the embodiments of the present specification without creative efforts.

The previous descriptions are merely specific implementations of the embodiments of the present specification. It should be noted that a person of ordinary skill in the art can further make several improvements or polishing without departing from the principle of the embodiments of the present specification, and the improvements or polishing shall fall within the protection scope of the embodiments of the present specification.

What is claimed is:

1. A computer-implemented method performed by a private key management program installed on a user device of a user, wherein the user device stores (i) an encrypted private key set obtained by using a predetermined encryption key to encrypt a private key set provided by the user and (ii) an association relationship between predetermined identification information of the user and the private key set, and wherein the method comprises:
    obtaining input identification information provided by the user;
    determining whether the input identification information matches the predetermined identification information of the user;
    in response to determining that the input identification information matches the predetermined identification information of the user, obtaining a decryption key provided by the user;
    determining whether the decryption key provided by the user is associated with the predetermined encryption key; and
    in response to determining that both (i) the input identification information matches the predetermined identification information of the user and (ii) the decryption key provided by the user is associated with the predetermined encryption key, returning the private key set to the user, wherein the private key set is obtained by using the decryption to process the encrypted private key set stored on the user device.

2. The computer-implemented method according to claim 1, wherein the private key set comprises at least one account private key of a blockchain account registered by the user.

3. The computer-implemented method according to claim 1, wherein the identification information comprises a mobile number or an identity card number of the user.

4. The computer-implemented method according to claim 1, wherein the identification information comprises biometric identification information of the user, wherein the biometric identification information comprises fingerprint information or face information.

5. The computer-implemented method according to claim 1, wherein
    the encrypted private key set is stored on the user device only after obtaining the predetermined identification information provided by the user.

6. The computer-implemented method according to claim 1, wherein the predetermined encryption key is an asymmetric key, and wherein determining whether the decryption key provided by the user is associated with the predetermined encryption key comprises processing the encrypted private key set using the decryption key provided by the user.

7. The computer-implemented method according to claim 1, wherein the predetermined encryption key is a symmetric key.

8. A non-transitory, computer-readable medium storing one or more instructions executable by a computer system to implement a private key management program on a user device of a user, wherein the user device stores (i) an encrypted private key set obtained by using a predetermined encryption key to encrypt a private key set provided by the user and (ii) an association relationship between predetermined identification information of the user and the private key set, and wherein the private key management program is configured to perform operations comprising:
    obtaining input identification information provided by the user;
    determining whether the input identification information matches the predetermined identification information of the user;
    in response to determining that the input identification information matches the predetermined identification information of the user, obtaining a decryption key provided by the user;
    determining whether the decryption key provided by the user is associated with the predetermined encryption key; and
    in response to determining that both (i) the input identification information matches the predetermined identification information of the user and (ii) the decryption key provided by the user is associated with the predetermined encryption key, returning the private key set to the user, wherein the private key set is obtained by using the decryption to process the encrypted private key set stored on the user device.

9. The non-transitory, computer-readable medium according to claim 8, wherein the private key set comprises at least one account private key of a blockchain account registered by the user.

10. The non-transitory, computer-readable medium according to claim 8, wherein the identification information comprises a mobile number or an identity card number of the user.

11. The non-transitory, computer-readable medium according to claim 8, wherein the identification information comprises biometric identification information of the user, wherein the biometric identification information comprises fingerprint information or face information.

12. The non-transitory, computer-readable medium according to claim 8, wherein
the encrypted private key set is stored on the user device only after obtaining the predetermined identification information provided by the user.

13. The non-transitory, computer-readable medium according to claim 8, wherein the predetermined encryption key is an asymmetric key, and wherein determining whether the decryption key provided by the user is associated with the predetermined encryption key comprises processing the encrypted private key set using the decryption key provided by the user.

14. The non-transitory, computer-readable medium according to claim 8, wherein the predetermined encryption key is a symmetric encryption key.

15. A computer-implemented system, comprising:
one or more computers; and
one or more computer memory devices interoperably coupled with the one or more computers and having tangible, non-transitory, machine-readable media storing one or more instructions that, when executed by the one or more computers, implement a private key management program on a user device of a user, wherein the user device stores (i) an encrypted private key set obtained by using a predetermined encryption key to encrypt a private key set provided by the user and (ii) an association relationship between predetermined identification information of the user and the private key set, and wherein the private key management program is configured to perform operations comprising:
obtaining input identification information provided by the user;
determining whether the input identification information matches the predetermined identification information of the user;
in response to determining that the input identification information matches the predetermined identification information of the user, obtaining a decryption key provided by the user;
determining whether the decryption key provided by the user is associated with the predetermined encryption key; and
in response to determining that both (i) the input identification information matches the predetermined identification information of the user and (ii) the decryption key provided by the user is associated with the predetermined encryption key, returning the private key set to the user, wherein the private key set is obtained by using the decryption to process the encrypted private key set stored on the user device.

16. The computer-implemented system according to claim 15, wherein the private key set comprises at least one account private key of a blockchain account registered by the user.

17. The computer-implemented system according to claim 15, wherein the identification information comprises a mobile number or an identity card number of the user.

18. The computer-implemented system according to claim 15, wherein the identification information comprises biometric identification information of the user, wherein the biometric identification information comprises fingerprint information or face information.

19. The computer-implemented system according to claim 15, wherein
the encrypted private key set is stored on the user device only after obtaining the predetermined identification information provided by the user.

20. The computer-implemented system according to claim 15, wherein the predetermined encryption key is an asymmetric key, and wherein determining whether the decryption key provided by the user is associated with the predetermined encryption key comprises processing the encrypted private key set using the decryption key provided by the user.

21. The computer-implemented system according to claim 15, wherein the predetermined encryption key is a symmetric encryption key.

* * * * *